Patented June 14, 1949

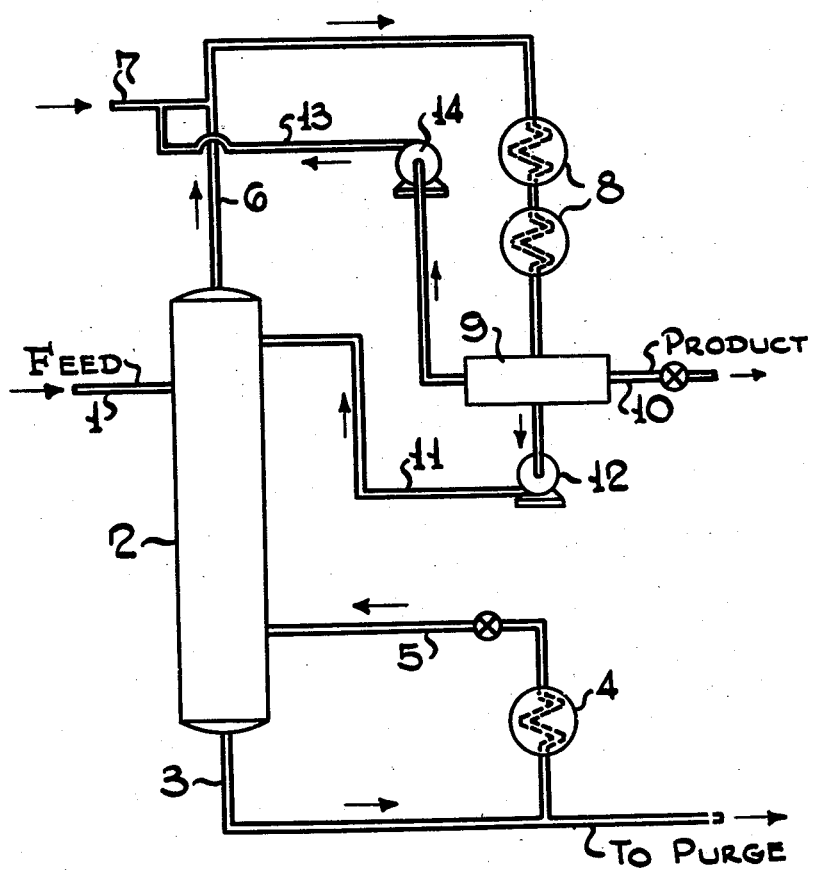

2,473,203

UNITED STATES PATENT OFFICE 2,473,203

DIOLEFIN DISTILLATION

Ralph F. Howe, Baton Rouge, La., assignor to Standard Oil Development Company, a corporation of Delaware Application February 26, 1946, Serial No. 650,316

10 Claims. (Cl. 202—57)

This invention relates to improvements in the distillation and concentration of diolefins, and particularly during the redistillation and purification of the diolefins.

Various solvents, such as furfural, acetone and metallic salt solutions, such as cuprous salt solutions, have been used for the separation and concentration of diolefins. The diolefins were then further purified by redistillation and considerable difficulties have been experienced as a result of the deposition of polymers formed during the redistillation both in the liquid and vapor phases. The polymers consist of a glassy material in the form of large crystals or of a sandy nature and tend to obstruct the flow of vapors through the redistillation tower. As a result, an interruption of the process has often been necessary.

The molecular weight of the polymer has not been determined, but it is believed to be essentially, for example, when a butadiene polymer is formed, one having a formula of $(C_4H_6)_x$. The formation of these polymers results in the fouling and plugging of the distillation tower and the build-up of pressure in the heat exchanger tube system, causing distortion of lines.

Control of the polymerization is obtained by the use of phenolic type of compounds as inhibitors—i. e., the mono-, di-, and tri-hydric phenols and their alkyl derivatives (alkyl constituents attached to the ring), amino inhibitors— i. e., phenyl-B-naphthylamine, hydroxy-naphthylamines, tertiary butyl catechol, diphenyl-p-phenylene diamine, isopropoxydiphenyl amine, aldol-alpha-naphthylamine (and polymers thereof), symm. di-B-naphthyl-p-phenylene diamine, trimethyldihydroquinoline (and polymers thereof), and the ditolylamines and reaction products of a ketone such as acetone and/or an aldehyde such as formaldehyde and acetaldehyde with an amine such as aniline.

The addition of inhibitor such as tertiary butyl catechol during the distillation of the diolefin, such as butadiene, reduces the polymerization both in the liquid phase and in the vapor phase. A further control of polymerization is obtained by adjustment of the overhead temperature and/or pressure of the still and the addition of an inhibitor such as tertiary butyl catechol to the reflux stream to inhibit liquid phase polymerization.

Polymerization is most likely to occur in the top of the distillation tower since inhibitor concentration is lower there, i. e., in the vapor phase regions. One difficulty in using inhibitors is that the diolefin, for example, butadiene, is extremely volatile while ordinary polymerization inhibitors are extremely non-volatile. This situation complicates the inhibiting of vapor phase butadiene polymerization in overhead lines, condensers, etc.

Therefore, it is extremely desirable to inhibit the polymerization occurring in the vapor phase. The best results are obtained by the introduction of the polymerization inhibitor, in this case tertiary butyl catechol, into the overhead vapor lines as a mist and thereby a uniform distribution of the inhibitor in the vapors presents substantially any polymer deposition.

The following table illustrates the rate of formation of polymeric butadiene and the effects of addition of the tertiary butyl catechol to the liquid phases:

Table

| Phase | Temp., °F. | Days | Rate of Formation of Polymeric Butadiene, gm./day | Remarks |
|---|---|---|---|---|
| Liquid | 160 | 4 | 0.0002 | 50 P. P. M. ter. butyl catechol in liquid phase. |
| Vapor | 160 | 2 | 0.0089 | Do. |
| Do | 160 | 4 | 0.0040 | Do. |
| Liquid | 160 | 2 | 0.0250 | No inhibitor in liquid phase. |
| Vapor | 160 | 3 | 0.073 | Do. |

The rate of formation of polymeric butadiene is materially less per day when an inhibitor is added, being reduced from about 0.0250 gm./day to about 0.0002 gm./day.

The invention will be more clearly understood on reading the following description with reference to the accompanying drawing in which numeral 1 designates a feed line in which the diolefin, in this case, butadiene, is introduced into distillation tower 2. The tower may be a packed tower or one with suitable plates. Heat is supplied by withdrawing a portion of the butadiene from the bottom section of the tower by means of the pipe 3 and passing it through heater 4 and returning it to the tower by means of pipe 5. From the upper part of the tower the vapors of butadiene are passed by means of pipe 6 into which said pipe 6 the inhibitor is introduced as a mist by means of pipe 7. The inhibitor sprayed in as a fine mist may consist of the inhibitor alone or in admixture with butadiene. The inhibitor is carried with the vapor by means of line 6 to condenser 8 and to separator 9. In separator 9 a portion of the product and the inhibitor is removed by pipe 10 and the remainder of inhibitor dissolved in the product is returned by means of pipe 11 supplied with pump 12 to the upper part of the distillation tower 2. By this means the inhibitor is found in admixture with the butadiene in all parts of the tower itself and also in the vapors as they pass from the tower until condensed and separated.

A part of the product with the inhibitor dissolved therein may be withdrawn by means of pipe 13 from separator 9 and by means of pump 14 passed to pipe 7.

A still used in the distillation of butadiene was operated for five months before the formation of a polymeric material was noted. Tertiary butyl catechol was added, not as a spray, but directly to the reflux drum, but plugging of the still occurred one month later. After cleaning the still, operation was continued for 19 days, after which plugging was so severe that an overhead condenser was broken. Tertiary butyl catechol was then added as a spray to the overhead lines. No polymer formation had appeared when the inspection of the unit was made one month later. A run of 170 days' duration was then effected successfully with no polymerization difficulties.

I claim:

1. In the distillation of a diolefin, the improvements which comprise introducing into distilled vapors of a diolefin as they are expelled from a still a relatively non-volatile polymerization inhibitor as a fine mist.

2. In the distillation of a diolefin, the improvement which comprises introducing into distilled vapors of a diolefin as they are expelled from a still a liquid mixture of some of the same diolefin being distilled containing tertiary butyl catechol as a fine mist.

3. In the distillation of butadiene, the improvement which comprises introducing into distilled vapors of butadiene as they are expelled from a still a relatively non-volatile polymerization inhibitor in liquid phase as a fine mist.

4. In the distillation of butadiene, the improvement which comprises the introduction into distilled vapors of butadiene as they are expelled from a still a liquid mixture of butadiene and a phenolic type of polymerization inhibitor, the said mixture being in the form of a fine mist.

5. In the distillation of butadiene, the improvement which comprises distilling butadiene and in the vapors of butadiene as they leave the still introducing a relatively non-volatile polymerization inhibitor in liquid phase as a fine mist, condensing the vapors and recycling the polymerization inhibitor as a solution to the upper part of the said still.

6. In the distillation of butadiene, the improvement which comprises maintaining a relatively non-volatile polymerization inhibitor in butadiene where present in the liquid phase and as a fine mist in the butadiene where present in the vapor phase.

7. In the distillation of butadiene, the improvement which comprises distilling butadiene from a mixture of butadiene and a relatively non-volatile polymerization inhibitor and as the vapors are formed introducing into said vapors a polymerization inhibitor in liquid phase as a fine mist and separating from the condensate of the said vapor, butadiene and the said polymerization inhibitor.

8. In the distillation of butadiene according to claim 7 the relatively non-volatile polymerization inhibitor used is a phenolic type of a polymerization inhibitor.

9. In the distillation of butadiene according to claim 7 the relatively non-volatile polymerization inhibitor used is a substituted naphthylamine inhibitor.

10. In the distillation of butadiene according to claim 7 the relatively non-volatile polymerization inhibitor used is tertiary butyl catechol.

RALPH F. HOWE.

REFERENCES CITED

The following references are of record in the file of this patent:

UNITED STATES PATENTS

| Number | Name | Date |
| --- | --- | --- |
| 2,257,780 | Bludworth | Oct. 7, 1941 |
| 2,407,861 | Wolk | Sept. 17, 1946 |